2,767,219

2,2',6,6'-TETRAHYDROXY-3,3'-DINITRO-5,5'-DI-CHLORODIPHENYLMETHANE AND ALKALI METAL SALTS THEREOF

Friedrich Becke, Bad Duerkheim, Herbert Libowitzky, Ludwigshafen (Rhine), Otto Markgraf, Neckargemuend, and Max Klug, Ludwigshafen (Rhine), Germany, assignors to Badische Anilin- & Soda-Fabrik Aktiengesellschaft, Ludwigshafen (Rhine), Germany No Drawing. Application November 8, 1955,
Serial No. 545,798

Claims priority, application Germany November 25, 1954

3 Claims. (Cl. 260—619)

This invention relates to a new and very valuable nitro dyestuff and a process for its production.

We have found that a new and valuable nitro dyestuff is obtained by reacting 6-chloro-4-nitroresorcinol in an alkaline medium with formaldehyde.

6-chloro-4-nitroresorcinol can be readily prepared by saponification of its dialkyl ether (obtainable by reacting 2.4.5-trichloro-1-nitrobenzene with methanolic or ethanolic sodium or potassium hydroxide as described in the German patent specification No. 135,331). Said saponification may be carried out by heating the dialkyl ether with aqueous methanolic sodium hydroxide solution in a closed vessel first 3 hours to 125° C. and then, while distilling off the methanol, 3 hours to 130° C. to 140° C. The 6-chloro-4-nitroresorcinol is precipitated from the saponification solution by means of mineral acids, such as hydrochloric or sulfuric acid. It forms yellow crystals melting at 119° C.

By the reaction of this resorcinol derivative with formaldehyde and caustic alkali solution, an alkali salt of 2.2'6.6' - tetrahydroxy - 3.3' - dinitro-5.5' - dichlorophenyl methane is obtained which can be used as such or can first be converted into the free tetrahydroxy compound by neutralization with mineral acid.

The new nitro dyestuff is especially suitable for dyeing wool, silk, hair, skins or feathers. It goes onto these substrates well and very uniformly in pure yellow shades from a neutral or weakly acid aqueous bath at about 30° C. It may also be used together with other dyestuffs, e. g. with oxidation dyestuffs of the meta-aminophenol type, and it is not attacked by the oxidizing agent, for example hydrogen peroxide, under the dyeing conditions. In this way it is possible to produce particularly clear additive dyeings.

The following example will further illustrate this invention but the invention is not restricted to this example. The parts are parts by weight.

Example

A mixture of 112 parts of 6-chloro-4-nitroresorcinol dimethyl ether (=6-chloro-4-nitro-1.3-dimethoxy benzene), 80 parts of methanol, 256 parts of water and 67.2 parts of sodium hydroxide are heated, while stirring, for 3 hours in a closed vessel at 125° C. The reaction mixture contains now the sodium salts of the isomeric mono-methyl ethers which can be isolated by means of their different solubilities; the pure 1-methyl ether melts at 98° C., the 3-methyl ether at 152° C.

Without separating and isolating said mono-methyl-esters the reaction vessel is combined with a refrigerator and heated at ordinary pressure until all methanol is distilled over. The residue is diluted by 250 parts of water, the vessel again closed and heated at 130° C. for 1 hour and then at 140° C. to 150° C. for other two hours. The resulting solution is quickly cooled to ordinary temperature and acidified with about 170 parts of 37 per cent hydrochloric acid.

There are obtained 80 parts of crude 6-chloro-4-nitroresorcinol which may immediately be reacted with formaldehyde as described in the next paragraph. By recrystallizing the crude product from methanol there are obtained yellow crystals melting at 119° C.

38 parts of 6-chloro-4-nitroresorcinol are heated with 40 parts of a 30 percent aqueous formaldehyde solution and 32 parts of methanol while stirring to 40° C. Into the resultant suspension, while further stirring, 48 parts of 50 percent caustic potash solution are allowed to flow in, the mixture being heated to about 60° C. to 80° C. whereby the reaction product begins to crystallize out. Stirring is continued for 1 to 2 hours at 50° C. to 60° C., then the mixture is allowed to cool and the crystalline precipitate filtered off by suction. After washing with cold water and drying, 43 parts of the dipotassium salt of 2.2'.6.6'- tetrahydroxy - 3.3 '- dinitro - 5.5'- dichlorodiphenylmethane are obtained corresponding to a yield of 92 per cent of the theoretical yield.

The free tetrahydroxy compound is obtained by dispersing or dissolving the dipotassium salt in hot water and acidifying with hydrochloric acid; it is obtained in the form of small yellow needles which melt at 234° C. to 235° C. after recrystallization from glacial acetic acid.

For the dyeing of skins, for example, a 0.1 to 0.5 per cent aqueous solution of the dipotassium salt is used which has been adjusted to a pH value between about 4 and 7 by the addition of small amounts of acid, if desired after the addition of the usual capillary-active agents.

What we claim is:

1. As a new nitro dyestuff the 2.2'.6.6'-tetrahydroxy-3.3'-dinitro-5.5'-dichlorodiphenyl methane.

2. A process for the production of 2.2'.6.6'-tetrahydroxy-3.3'-dinitro - 5.5' - dichlorodiphenylmethane which consists in saponifying a member of the group consisting of 6-chloro-4-nitroresorcinol dimethyl and diethyl ethers with aqueous alkali metal hydroxide solutions at temperatures up to about 150° C. and reacting the 6-chloro-4-nitro resorcinol obtained with formaldehyde in an alkaline medium.

3. A process for the production of 2.2'.6.6'-tetrahydroxy-3.3'-dinitro-5.5'-dichloro diphenylmethane which consists in heating 6-chloro-4-nitroresorcinol with an aqueous formaldehyde solution to about 40° C., adding aqueous potassium hydroxide solution to the reaction mixture and isolating the dipotassium salt of the 2.2'.6.6'-tetrahydroxy - 3.3'-dinitro - 5.5'-dichlorodiphenylmethane crystallized out.

References Cited in the file of this patent

UNITED STATES PATENTS

| | | |
|---|---|---|
| 2,540,633 | Rourk | Feb. 6, 1951 |
| 2,544,826 | Craige, Jr. | Mar. 13, 1951 |
| 2,615,052 | Faith | Oct. 21, 1952 |
| 2,739,941 | Chiddix et al. | Mar. 27, 1956 |